(12) United States Patent
Pettersson et al.

(10) Patent No.: US 7,248,250 B2
(45) Date of Patent: Jul. 24, 2007

(54) ORIENTATION DISCRIMINATION IN A POSITION-CODING PATTERN

(75) Inventors: Mats Petter Pettersson, Lund (SE); Tomas Edso, Lund (SE)

(73) Assignee: Anoto AB, Lund (SE)

( * ) Notice: Subject to any disclaimer, the term of this patent is extended or adjusted under 35 U.S.C. 154(b) by 659 days.

(21) Appl. No.: 10/687,874

(22) Filed: Oct. 20, 2003

(65) Prior Publication Data

US 2004/0113893 A1 Jun. 17, 2004
US 2005/0104861 A9 May 19, 2005

(51) Int. Cl.
G09G 5/00 (2006.01)

(52) U.S. Cl. ...................................................... 345/179
(58) Field of Classification Search ................ 345/156, 345/179; 382/313, 314
See application file for complete search history.

(56) References Cited

U.S. PATENT DOCUMENTS

| | | |
|---|---|---|
| 5,477,012 A | 12/1995 | Sekendur |
| 5,652,412 A | 7/1997 | Lazzouni et al. |
| 5,661,506 A | 8/1997 | Lazzouni et al. |
| 5,675,129 A | 10/1997 | Burns et al. |
| 5,852,434 A | 12/1998 | Sekendur et al. |
| 5,937,110 A | 8/1999 | Petrie et al. |
| 6,208,771 B1 | 3/2001 | Jared et al. |
| 6,502,756 B1 * | 1/2003 | Fåhraeus ............... 235/494 |

FOREIGN PATENT DOCUMENTS

| | | |
|---|---|---|
| EP | 01 71284 A2 | 2/1986 |
| EP | 02 06246 A2 | 12/1986 |
| JP | 10-257309 | 9/1998 |
| WO | WO 92 17859 | 10/1992 |

OTHER PUBLICATIONS

Christer Fåhraeus, Jan Nilsson, and Patrik Söderlund, U.S. Appl. No. 09/301,856, filed Apr. 29, 1999.

* cited by examiner

Primary Examiner—Amr A. Awad
Assistant Examiner—Michael Pervan
(74) Attorney, Agent, or Firm—Birch, Stewart, Kolasch & Birch, LLP

(57) ABSTRACT

A position code is applied on a surface to code positions in one or more directions. The code is based on a main number series which has the property that the place in the main number series of each number sequence of a first predetermined length is unambiguously determined. A position is determined based on one or more such number sequences of the first predetermined length. The orientation of the position code is discriminable from the main number series, but only for number sequences of a second predetermined length that exceeds the first predetermined length.

63 Claims, 4 Drawing Sheets

ORIENTATION DISCRIMINATION IN A POSITION-CODING PATTERN

CROSS REFERENCE TO RELATED APPLICATION

This application claims the benefit of U.S. Provisional Application No. 60/157,967, Oct. 6, 1999; U.S. Non-Provisional Application No. 09/676,893, filed on Oct. 2, 2000, and Application No. SE 990 3541.2, filed in Sweden on Oct. 1, 1999, which are incorporated herein by reference.

FIELD OF THE INVENTION

This invention concerns a method of providing a position code The invention also concerns a method of calculation a position The invention also concerns computer programs products, a device for position determination and a product with a position code.

BACKGROUND OF THE INVENTION

In many situations it is desirable to be able to determine an absolute position on a surface. One example concerns the digitization of drawings. Another is when an electronic version of handwritten information is required.

U.S. Pat. No. 5,852,434 describes a device for determining an absolute position. The device comprises a writing surface which is provided with a position-coding pattern by means of which X-Y-coordinates can be determined, a detector which can detect the position-coding pattern and a processor which, on the basis of the detected position-coding pattern, can determine the position of the detector relative to the writing surface. The device makes it possible for a user to enter handwritten and hand-drawn information into a computer at the same time as the information is being written/drawn on the writing surface.

Three examples of position coding are given in U.S. Pat. No. 5,852,434. The first example is symbols, each of which is constructed of three concentric circles. The outer circle represents the X-coordinate and the middle circle the Y-coordinate. Both the outer circles are additionally divided into 16 parts which, depending upon whether they are filled in or not, indicate different numbers. This means that each pair of coordinates X, Y is coded by a complex symbol with a particular appearance.

In the second example the coordinates of each point on the writing surface are given by means of bar-codes, a bar-code for the X-coordinate being shown above a bar-code for the Y-coordinate.

A checkered pattern which can be used to code the X- and Y-coordinates is given as a third example. However, there is no explanation as to how the checkered pattern is constructed or how it can be converted into coordinates.

A problem with the known pattern is that it is constructed of complex symbols and the smaller these symbols are made, the more difficult it is to produce the patterned writing surface and the greater the risk of incorrect position determinations, while the larger the symbols are made, the poorer the position resolution becomes.

A further problem is that the processing of the detected position-coding pattern becomes rather complicated, due to the fact that a processor has to interpret complex symbols.

An additional problem is that the detector must be constructed in such a way that it can record four symbols at the same time so that it is certain to cover at least one symbol in its entirety, which is necessary in order for the position determination to be able to be carried out. The ratio between the required sensor surface and the surface of the position-coding pattern which defines a position is thus large.

Appendix A to WO 92/17859 gives the following example of how the pattern can be constructed and how a position can be decoded.

Take the following m-sequences: s=(0, 0, 1, 0, 1, 1, 1) and t=(0, 1, 1). Build up a position-coding pattern by letting a first column in the pattern be equal to the sequence s. In order to build up the following columns, look at the t-sequence. If the first element in the t-sequence is 0 then the second column consists of the s-sequence. If the first element is 1 instead, then the second column consists of the s-sequence cyclic-shifted by one step. Subsequent columns are built up in a corresponding way in accordance with the values of the elements in the t-sequence. The following pattern is then obtained:

| | | | |
|---|---|---|---|
| 0 | 0 | 1 | 1 |
| 0 | 0 | 0 | 1 |
| 1 | 1 | 0 | 0 |
| 0 | 0 | 1 | 0 |
| 1 | 1 | 0 | 1 |
| 1 | 1 | 1 | 0 |
| 1 | 1 | 1 | 1 |

Assume now that one wants to find the position of a partial surface with the subset of the pattern shown below.

| | | |
|---|---|---|
| 1 | 0 | 0 |
| 0 | 1 | 0 |
| 1 | 0 | 1 |

The first column in the subset is (1, 0, 1). This sub-sequence appears in position 2 in the s-sequence. The cyclic shifts in the subset are (1, 1). This sub-sequence appears in position 1 in the t-sequence. The accumulated shifts in the pattern is (0, 0, 1, 2) and therefore the vertical position of the subset is 2+0=2. The position of the subset on the partial surface is thus (1, 2).

With this pattern the above-mentioned problems with complex symbols are avoided and the ratio is reduced between the required sensor surface and the surface of the position-coding pattern which defines a position.

An interesting characteristic of a position-coding pattern of this type is, however, the ability to code a large pattern with many unique positions so that position determination can be carried out on as large a surface as possible. In the example described above, the size in the vertical direction is limited by the length of the s-sequence and the size in the horizontal direction by the length of the t-sequence. The length of these sequences can, however, not be increased without limit as the sequences should have the characteristic that if a sub-sequence of k bits is taken, this sub-sequence should only occur in one position in the sequence. An increase in the length of the sequence can thus imply an increase in the length of the sub-sequence and thereby an increase of the partial surface which must be recorded in order to be able to determine a position.

SUMMARY OF THE INVENTION

An object of this invention is to show how a position code which makes possible coding of a large number of positions can be provided.

According to a first aspect, the invention concerns more particularly a method of providing a position code on a surface, which position code codes a plurality of positions in a first direction on the surface, comprising the steps of using a first cyclic number series, which has the characteristic that the position in the number series of each number sequence of a first predetermined length is determined unambiguously; printing out the first cyclic number series a plurality of times across the surface, different rotations of the first cyclic number series being used so that predetermined displacements arise between adjacent number series.

The method is characterized in that the step of printing out comprises dividing the surface into a plurality of first code windows in the first direction, each of which comprises at least three first cyclic number series and has one number series overlapping one number series of adjacent first code windows, and using such rotations of the first cyclic number series when printing this out that the position of each first code window in the first direction is coded by means of the displacements between the first cyclic number series belonging to the code window.

This differs from prior-art in that the position code is divided into a plurality of code windows, the respective position of which is coded by the size of the displacements between the cyclic number series which belong to the code window. The code windows are so arranged that no displacement belongs to more than one code window. The coding in the first direction is thus no longer based on displacements which follow a cyclic number series and consequently avoids the restrictions which this implies.

The above-mentioned displacements can in practice be determined as the difference between the corresponding number sequences in the number series.

One rotation of the cyclic number series can also be referred to as a cyclic-shifted version of the number series. Different rotations thus start at different places in the number series.

As will be explained later, the printout of the cyclic number series does not need to be carried out with numbers in explicit form, but the numbers can preferably be printed out using graphic symbols which are easier to recognize, for example by image processing of the position code.

In a preferred embodiment, such rotations of the cyclic number series are used that at least some of the displacements are greater than one. As a result, a much greater number of positions can be coded in the first direction than if only displacements with one step had been used.

In a preferred embodiment, in addition such rotations of the first cyclic number series are used that the displacements of each code window define a position number in mixed base which indicates the position of the first code window in the first direction and in addition the least significant displacement is indicated in the position number.

The position number can be n-adic, where n is the number of first cyclic number series within a code window minus one.

The indication of the least significant displacement in the position number makes it possible to determine the position of partial surfaces which are the same size as the code windows but which do not coincide with any of these but partly overlap two code windows in the first direction.

The least significant displacement can be indicated in various ways. One way comprises using such rotations of the first cyclic number series that the least significant displacement is less than other displacements. Another way comprises using such rotations of the first cyclic number series that the least significant displacement lies within a first size range and other displacements lie within a second size range.

The first way gives the ability to code more positions.

In a preferred embodiment, the method further comprises the step of creating different variants of the position code by letting the first cyclic number series in the first direction, that is the cyclic number series from which the first displacement is calculated, start in different positions for different variants.

As a result, the maximum number of codable positions is further increased. The number of possible variants is equal to the number of numbers in the first cyclic number series.

In a preferred embodiment, the position code also codes a plurality of positions in a second direction on the surface and the method comprises for this purpose the steps of using a second cyclic number series, which has the characteristic that the position in the number series of each number sequence of a second predetermined length is determined unambiguously, printing out the second cyclic number series across the surface a plurality of times, different rotations of the second cyclic number series being used so that the second cyclic number series start at different start positions, the step of printing out comprises dividing the surface into a plurality of non-overlapping second code windows, each of which comprises a predetermined plurality of second cyclic number series and using such rotations of the second cyclic number series that the position of each second code window in the second direction is coded by means of the start positions of the associated second cyclic number series.

The coding in the second direction is based on the same principle as the coding in the first direction, namely on the use of code windows with the associated advantages. However, here the start positions for the second cyclic number series are used instead of the displacements, which gives the possibility of more positions. This is based, however, on the position in the first direction being known.

The method of coding positions in the second direction can be used together with methods of coding positions in the first direction other than the method according to the invention.

The position in the second direction can be coded by a position number in mixed base and the least significant start position can be indicated similarly to the code windows in the first direction and with corresponding advantages.

In a preferred embodiment, the second cyclic number series is identical to the first cyclic number series, which is preferably binary. This is advantageous in connection with the decoding as it is sufficient to store a table with positions corresponding to the number sequences. In addition, the first and the second code windows can be the same size and can overlap each other.

A simple position code for positions in a Cartesian coordinate system is obtained if the first cyclic number series is printed out in columns across the surface and the second cyclic number series is printed out in rows across the surface or vice versa. The numbers in the number series can be printed out once in each row/column or several times in succession. The same rotation of the number series is then used throughout the same row/column.

In a preferred embodiment, the printing out of the first and the second cyclic number series is carried out in such a way that each intersection between raster lines in a raster which covers the surface is allocated a number from the first cyclic number sequence and a number from the second cyclic number sequence and the numbers belonging to each intersection are coded graphically by a mark on the surface at the intersection. The raster can be printed out on the surface, but is preferably virtual.

At each intersection there is thus a number which belongs to the position coding for the first direction and a number which belongs to the position coding for the second direction. These numbers can be separated when decoding, but they can be coded by a common mark on the surface. This makes possible a high resolution and a high density of information.

The intersections can also be called raster points.

In a preferred embodiment, the various possible combinations of numbers from the first and the second cyclic number series are coded by different locations of the mark relative to the intersection.

If both the number series are bit series, four different possible number combinations are obtained (0,0; 1,0; 0,1; and 1,1). These are coded by four different locations of the mark. The different locations can be a predetermined displacement from the intersection along the four different raster lines which extend from this. The intersection can be regarded as a nominal position, relative to which the mark is displaced.

The use of marks which represent different values dependent upon their location has many advantages. Among other things, all marks can have the same appearance, which facilitates the arranging of the position code on a surface.

The numbers which are allocated to the intersections can naturally be represented graphically in other ways than by means of a displaced mark. Instead, four marks with different appearances can be used, or a mark for each of the numbers.

The method described above can be implemented in a computer program, in an ASIC (Application Specific Integrated Circuit) or an FPGA (Field Programmable Gate Array) or in some other suitable way.

Another object of the invention is to provide a method of determining a position, which method is suitable to be used together with a position code of the type which is described above.

This object is achieved wholly or partly by a method and a computer program product.

According to a second aspect, the invention thus concerns a method of calculating a position, in a first direction, for an arbitrary partial surface of a predetermined size on a surface which is provided with a position code, which for the position coding in the first direction is based on a first cyclic number series, which has the characteristic that the position in the number series of each first number sequence of a first predetermined length is determined unambiguously and which is printed out a plurality of times on the surface with different rotations so that adjacent first cyclic number series are displaced relative to each other by predetermined displacements, comprising the steps of identifying a plurality of first number sequences from the position code on the partial surface, determining the position of each first number sequence in the first cyclic number series, determining on the basis of these positions the displacements between the adjacent first cyclic number series containing the first number sequences from the partial surface. The method is characterized by the steps of determining from the displacements a position in the first direction of a first code window, which the said partial surface at least partly overlaps, which first code window is one of a plurality of code windows in the first direction, each of which comprises a predetermined plurality of first cyclic number series and has one number series overlapping one number series of adjacent first code windows.

This method is advantageous as it makes possible position determination on a surface which has a position code which codes a large number of positions.

The method can be implemented in a computer program, in an ASIC or an FPGA or in some other suitable way.

The method of determining a position can be implemented with additional steps which are adapted to decode different implementations of the position-coding pattern which is obtained as a result of the method of providing a position code described above. These steps are also described in greater detail in the specific descriptive section.

A further object of this invention is to provide a device for position determination which is suitable to use for decoding a position-coding pattern of the type described above.

This object is achieved by a device according to claim 31.

According to a third aspect, the invention thus concerns a device for position determination, comprising a sensor for producing an image of a partial surface of a surface that is provided with a position code, and image processing means that is arranged to calculate based on the subset of the position code which is present in the image of the partial surface a position of the partial surface.

A further object of the invention is to provide a product with a position-coding pattern which makes possible coding of a large number of positions.

According to a fourth aspect, the invention thus concerns a product which makes possible determination of a position in a first direction for an arbitrary partial surface of a predetermined size on a surface of the product which is provided with a position code, which for the position coding in the first direction is based on a first cyclic number series, which has the characteristic that the position in the number series of each first number sequence of a first predetermined length is determined unambiguously and which is printed out a plurality of times on the surface with different rotations so that adjacent first cyclic number series are displaced relative to each other by predetermined displacements, a plurality of first number sequences from the position code being identifiable on the partial surface, in order to determine the position of each first number sequence in the first cyclic number series, and the displacements between the adjacent first cyclic number series containing the first number sequences from the partial surface being determinable on the basis of these positions. The product is characterized in that a position in the first direction of a first code window which said partial surface at least partly overlaps is determinable from the displacements, which first code window is one of a plurality of code windows in the first direction, each of which comprises a predetermined plurality of first cyclic number series and has one number series overlapping one number series of adjacent first code windows.

The advantages of the product are apparent from the discussion above. The features which are described in connection with the methods of providing a position code and determining a position are naturally also applicable to the product.

BRIEF DESCRIPTION OF THE DRAWINGS

In the following the invention will be described in greater detail by way of an embodiment and with reference to the accompanying drawings, in which.

DESCRIPTION OF A PREFERRED EMBODIMENT

Figure 1:
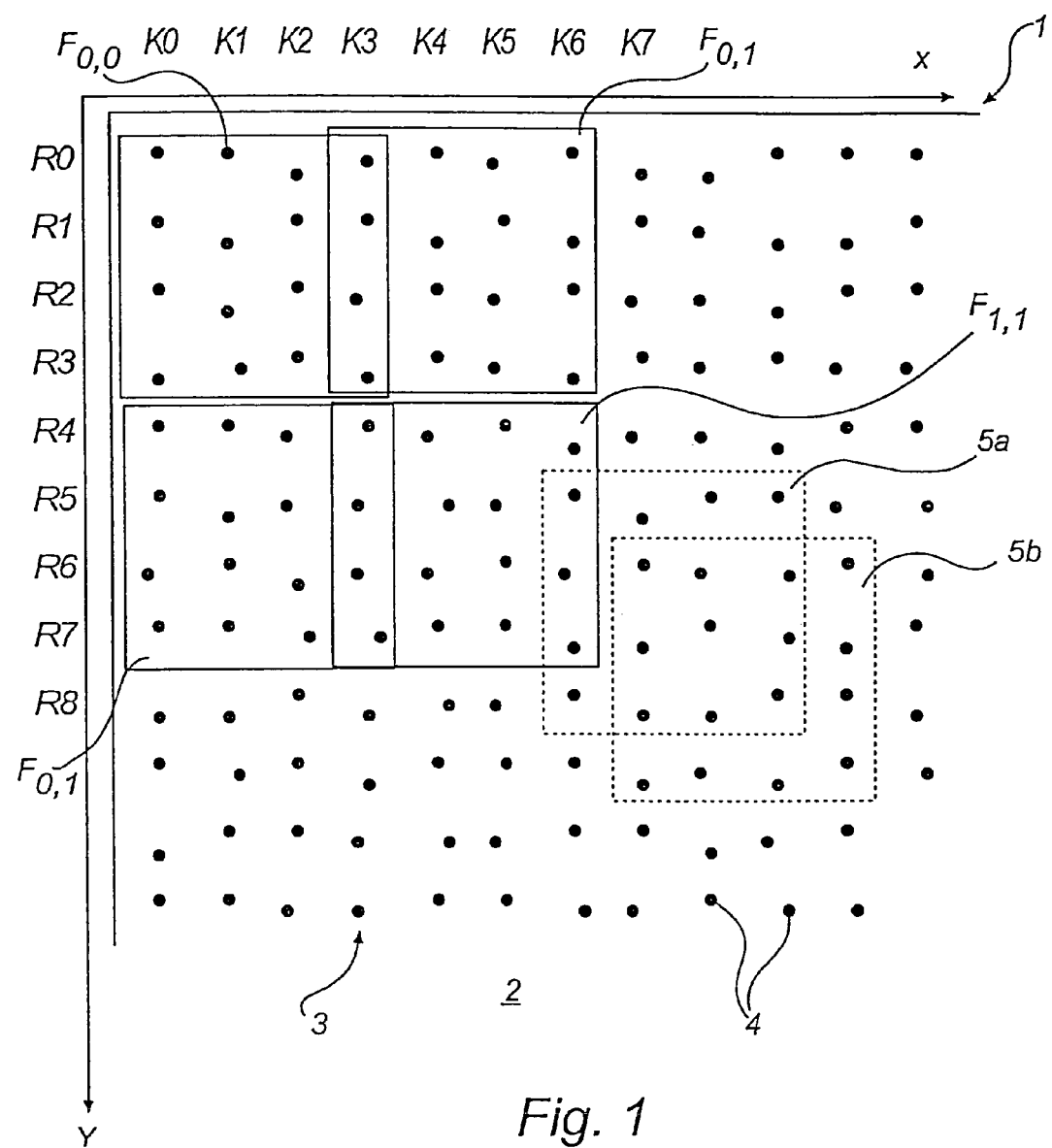
FIG. 1 shows schematically an embodiment of a product which is provided with a position-coding pattern.
Figure 2:
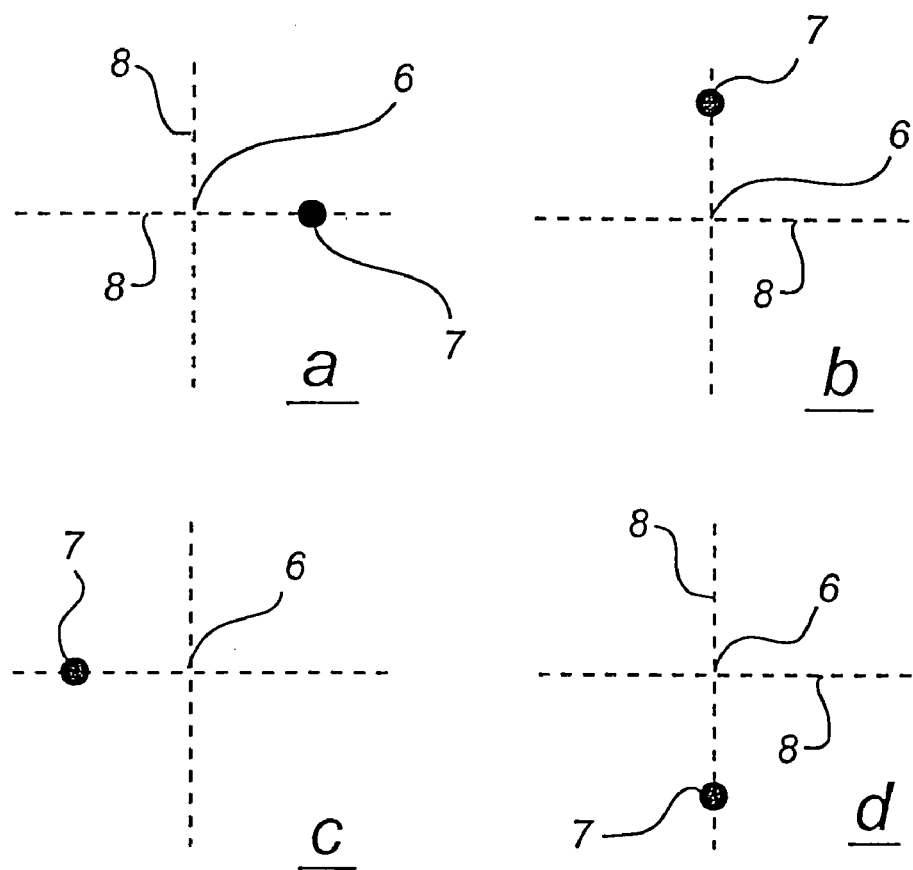
FIG. 2 shows schematically how the marks can be designed and positioned in an embodiment of the invention.

FIG. 1 shows a part of a product in the form of a sheet of paper 1, which on at least part of its surface 2 is provided with an optically readable position-coding pattern 3 which makes possible position determination.

The position-coding pattern comprises marks 4, which are systematically arranged across the surface 2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to provide an electronic representation of information which is written or drawn on the surface. The electronic representation can be provided, while writing on the surface with a pen, by continuously determining the position of the pen on the sheet of paper by reading the position-coding pattern.

The position-coding pattern comprises a virtual raster, which is thus neither visible to the eye nor can be detected directly by a device which is to determine positions on the surface, and a plurality of marks 4, each of which, depending upon its location, represents one of four values "1" to "4" as described below. In this connection it should be pointed out that for the sake of clarity the position-coding pattern in FIG. 1 is greatly enlarged. In addition, it is shown arranged only on part of the sheet of paper.

The position-coding pattern is so arranged that the position of a partial surface on the total writing surface is determined unambiguously by the marks on this partial surface. A first and a second partial surface 5a, 5b are shown by broken lines in FIG. 1. The second partial surface partly overlaps the first partial surface. The part of the position-coding pattern (here 4*4 marks) on the first partial surface 5a codes a first position and the part of the position-coding pattern on the second partial surface 5b codes a second position. The position-coding pattern is thus partly the same for the adjoining first and second positions. Such a position-coding pattern is called "floating" in this application. Each partial surface codes a specific position.

FIGS. 2a-d show how a mark can be designed and how it can be located relative to its nominal position 6. The nominal position 6, which also can be called a raster point, is represented by the intersection of the raster lines 8. The mark 7 has the shape of a circular dot. A mark 7 and a raster point 6 can together be said to constitute a symbol.

In one embodiment, the distance between the raster lines is 300 μm and the angle between the raster lines is 90 degrees. Other raster intervals are possible, for example 254 μm to suit printers and scanners which often have a resolution which is a multiple of 100 dpi, which corresponds to a distance between points of 25.4 mm/100, that is 254 μm.

The value of the mark thus depends upon where the mark is located relative to the nominal position. In the example in FIG. 2 there are four possible locations, one on each of the raster lines extending from the nominal position. The displacement from the nominal position is the same size for all values.

Each mark 7 is displaced relative to its nominal position 6, that is no mark is located at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so well-defined, the pattern is unaffected by such interference.

In one embodiment, the marks are displaced by 50 μm relative to the nominal positions 6 along the raster lines 8. The displacement is preferably ⅙ of the raster interval, as it is then relatively easy to determine to which nominal position a particular mark belongs. The displacement should be at least approximately ⅛ of the raster interval, otherwise it becomes difficult to determine a displacement, that is the requirement for resolution becomes great. On the other hand, the displacement should be less than approximately ¼ of the raster interval in order for it to be possible to determine to which nominal position a mark belongs.

The displacement does not need to be along the raster line, but the marks can be positioned in separate quadrants. However, if the marks are displaced along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers a plurality of pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 2a represents the value 1, in FIG. 2b the value 2, in FIG. 2c the value 3 and in FIG. 2d the value 4.

Each mark can thus represent one of four values "1 to 4". This means that the position-coding pattern can be divided into a first position code for the x-coordinate and a second position code for the y-coordinate. The division is carried out as follows:

| Mark value | x-code | y-code |
| --- | --- | --- |
| 1 | 1 | 1 |
| 2 | 0 | 1 |
| 3 | 1 | 0 |
| 4 | 0 | 0 |

The value of each mark is thus converted into a first value, here bit, for the x-code and a second value, here bit, for the y-code. In this way two completely independent bit patterns are obtained by means of the pattern. Conversely, two or more bit patterns can be combined into a common pattern which is coded graphically by means of a plurality of marks in accordance with FIG. 2.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four-bit-long bit sequence occurs more than once in the bit series. The bit series is cyclic, which means that the characteristic also applies when the end of the series is connected to its beginning. A four-bit sequence has thus always an unambiguously determined position number in the bit series.

The bit series can be a maximum of 16 bits long if it is to have the characteristic described above for bit sequences of four bits. In this example, however, only a seven-bit-long bit series is used, as follows:

"0 0 0 1 0 1 0".

This bit series contains seven unique bit sequences of four bits which code a position number in the series as follows:

| Position number in the series | Sequence |
| --- | --- |
| 0 | 0001 |
| 1 | 0010 |
| 2 | 0101 |
| 3 | 1010 |
| 4 | 0100 |
| 5 | 1000 |
| 6 | 0000 |

To code the x-coordinate, the bit series is written sequentially in columns over all the surface which is to be coded, where the left column $K_0$ corresponds to the x-coordinate zero (0). In one column the bit series can thus be repeated several times in succession.

The coding is based on differences or position displacements between adjacent bit series in adjacent columns. The size of the difference is determined by the position number (that is the bit sequence) in the bit series with which the adjacent columns commence.

More precisely, if one takes the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", along the two columns the difference is created. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four positions can be obtained in the y-direction. These three differences and four positions code the position of the partial surface in the x-direction and the y-direction. Adjacent windows in the x-direction have a common column, see FIG. 1. Thus the first code window $F_{0,0}$ contains bit sequences from the columns $K_0$, $K_1$, $K_2$, $K_3$, and bit sequences from the rows $R_0$, $R_1$, $R_2$, $R_3$. As differences are used in the x-direction, the next window diagonally in the x-direction and y-direction, the window $F_{1,1}$, contains bit sequences from the columns $K_3$, $K_4$, $K_5$, $K_6$, and the rows $R_4$, $R_5$, $R_6$, $R_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 1, for example $F_{0,0}$.

Each window has window coordinates $F_x$, which give the position of the window in the x-direction, and $F_y$, which give the position of the window in the y-direction. Thus the correspondence between the windows and columns is as follows.

$K_i=3 F_x$ $R_j=4 F_y$

The coding is carried out in such a way that for the three differences, one of the differences $\Delta_0$ always has the value 1 or 2, which indicates the least significant digit $S_0$ for the number which represents the position of the code window in the x-direction, and both the other differences $\Delta_1$, $\Delta_2$, have values in the range 3 to 6, which indicates the two most significant digits $S_1$, $S_2$, for the coordinate of the code window. Thus no difference can be zero for the x-coordinates, as that would result in too symmetrical a code pattern. In other words, the columns are coded so that the differences are as follows: (3 to 6); (3 to 6); (1 to 2); (3 to 6); (3 to 6); (1 to 2); (3 to 6); (3 to 6); (1 to 2); (3 to 6); (3 to 6); . . .

Each x-coordinate is thus coded by two differences $\Delta_1$, $\Delta_2$ of between 3 and 6 and a subsequent difference $\Delta_0$ which is 1 or 2. By subtracting one (1) from the least difference $\Delta_0$ and three (3) from the other differences, three digits are obtained, $S_2$, $S_1$, $S_0$, which in a mixed base directly give the position number of the code window in the x-direction, from which the x-coordinate can then be determined directly, as shown in the example below. The position number of the code window is:

$S_2*(4*2)+S_1*2+S_0*1$

Using the principle described above, it is thus possible to code code windows 0, 1, 2, . . . , 31, using a position number for the code window consisting of three digits which are represented by three differences. These differences are coded by a bit pattern which is based on the number series above. The bit pattern can finally be coded graphically by means of the marks in FIG. 2.

In many cases, when a partial surface is recorded consisting of 4*4 marks, a complete position number which codes the x-coordinate will not be obtained, but parts of two position numbers, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, a row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows: (2 to 6); (2 to 6); (2 to 6); (0 to 1); (2 to 6); (2 to 6); (2 to 6); (0 to 1); (2 to 6); . . .

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained, in a way similarly to the x-direction, from which the position number of the code window can be determined directly, which is:

$$S_3*(5*5*2)+S_2*(5*2)+S_1*2+S_0*1$$

Using the method above, it is possible to code 4*4*2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window starts. If it is taken into account that this first number series can start in seven different positions, it is possible to code 7*96000=672000 positions. The start position of the first number series in the first column $K_0$ can be calculated when the x- and y-coordinates have been determined. The above-mentioned seven different start positions for the first series can code different pages or writing surfaces of a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/672000).

The redundancy consists partly in the restrictions on the size of the differences, and partly in only seven bits out of 16 being used in the position code. This latter fact can, however, be used to determine the rotational position of the partial surface. If the next bit in the bit series is added to the four-bit sequence, a five-bit sequence is obtained. The fifth bit is obtained by reading the adjacent bit immediately outside the partial surface which is being used. Such an additional bit is often easily available.

The partial surface which is read by the sensor can have four different rotational positions, rotated through 0, 90, 180 or 270 degrees relative to the code window. In those cases where the partial surface is rotated, the reading of the code will, however, be such that the code read will be inverted and reversed in either the x-direction or the y-direction or both, in comparison to the case where it had been read at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |
| 3 | 1 | 1 |
| 4 | 0 | 1 |

The above-mentioned five-bit sequence has the characteristic that it only occurs the right way round and not in inverted and reversed form in the seven-bit series. This is apparent from the fact that the bit series (0 0 0 1 0 1 0) contains only two "ones". Therefore all five-bit sequences must contain at least three zeros, which after inversion (and reversing, if any) results in three ones, which cannot occur. Thus if a five-bit sequence is found which does not have a position number in the bit series, it can be concluded that the partial surface should probably be rotated and the new position tested.

In order to provide further illustrations of the invention according to this embodiment, here follows a specific example which is based on the described embodiment of the position code.

Figure 3:
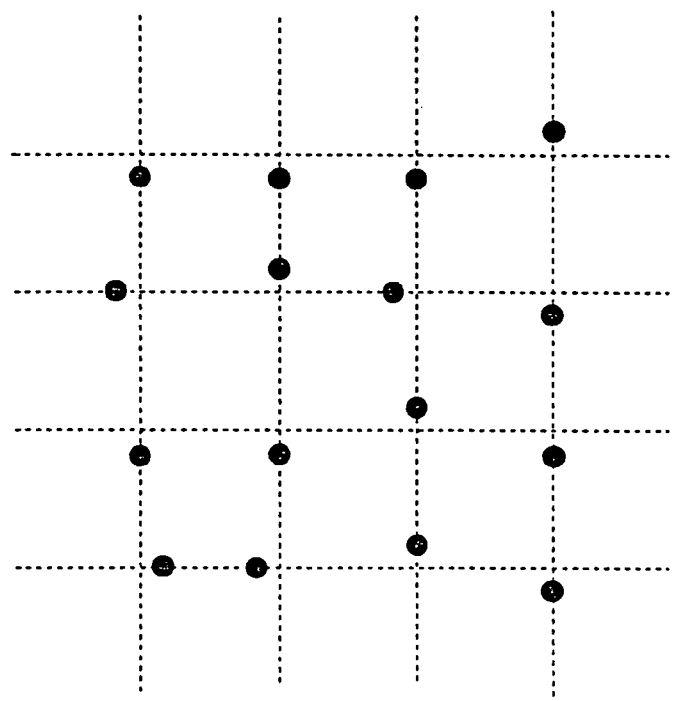
FIG. 3 shows schematically an example of 4*4 symbols which are used to code a position.

FIG. 3 shows an example of an image with 4*4 marks which are read by a device for position determination.

These 4*4 marks have the following values:

| | | | |
|---|---|---|---|
| 4 | 4 | 4 | 2 |
| 3 | 2 | 3 | 4 |
| 4 | 4 | 2 | 4 |
| 1 | 3 | 2 | 4 |

These values represent the following binary x- and y-codes:

| x-code: | | | | y-code: | | | |
|---|---|---|---|---|---|---|---|
| 0 | 0 | 0 | 0 | 0 | 0 | 0 | 1 |
| 1 | 0 | 1 | 0 | 0 | 1 | 0 | 0 |
| 0 | 0 | 0 | 0 | 0 | 0 | 1 | 0 |
| 1 | 1 | 0 | 0 | 1 | 0 | 1 | 0 |

The vertical bit sequences in the x-code code the following positions in the bit series: 2 0 4 6. The differences between the columns are −2 4 2, which modulo 7 gives: 5 4 2, which in mixed base codes the position number of the code window: (5−3)*8+(4−3)*2+(2−1)=16+2+1=19. The first coded code window has the position number 0. Thus the difference which lies in the range 1 to 2 and which appears in the 4*4 marks of the partial surface is the twentieth such difference. As additionally there are in total three columns for each such difference and there is a start column, the vertical sequence furthest to the right in the 4*4 x-code belongs to the 61st column (column 60) in the x-code (3*20+1=61) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is the value of these minus 57 modulo 7, which gives the start positions 6 3 0 2. Converted to digits in the mixed base, this becomes 6-2, 3-2, 0-0, 2-2=4 1 0 0, where the third digit is the least significant digit in the number concerned. The fourth digit is then the most significant digit in the next number. It must in this case be the same as in the number concerned. (The exception is when the number concerned consists of the highest possible digits in all positions. Then it is known that the beginning of the next number is one greater than the beginning of the number concerned.)

The position number is in mixed base 0*50+4*10+1*2+ 0*1=42.

The third horizontal bit sequence in the y-code thus belongs to the 43rd code window which has a start position 0 or 1, and as there are four rows in total for each such code window, the third row is number 43*4=172.

In this example, the position of the top left corner of the partial surface with 4*4 marks is (58, 170).

As the vertical bit sequences in the x-code in the 4*4 group start at row 170, the whole pattern's x-columns start in the positions of the number series ((2 0 4 6)–169) modulo 7=1 6 3 5. Between the last start position (5) and the first start position the numbers 0-19 are coded in the mixed base, and by adding the representations of the numbers 0-19 in the mixed base the total difference between these columns is obtained. A naive algorithm for doing this is to generate these twenty numbers and directly add their digits. Call the sum obtained s. The page or writing surface is then given by (5-s) modulo 7.

An alternative method for determining which bit is the least significant in a partial surface in order to be able to identify a code window in this way is as follows. The least significant bit (LSB) is defined as the digit which is the lowest in a partial surface's differences or row position number. In this way the reduction (redundancy) of the maximum useable number of coordinates is relatively small. For example, the first code windows in the x-direction in the example above can all have LSB=1 and other digits between 2 and 6, which gives 25 code windows, the next can have LSB=2 and other digits between 3 and 6, which gives 16 code windows, the next can have LSB=3 and other digits between 4 and 6, which gives 9 code windows, the next can have LSB=4 and other digits between 5 and 6, which gives 4 code windows, the next can have LSB=5 and other digits 6, which gives 1 code window, that is a total of 55 code windows, compared to 32 in the example above.

In the example above, an embodiment has been described where each code window is coded by 4*4 marks and a number series with 7 bits is used. This is of course only one example. Positions can be coded by more or fewer marks. There does not need to be the same number in both directions. The number series can be of different length and does not need to be binary, but can be based on a different base, for example hex code. Different number series can be used for coding in the x-direction and coding in the y-direction. The marks can represent different numbers of values.

In a practical example, a partial surface is used consisting of 6*6 marks and where the bit series as a maximum can consist of $2^6$ bits, that is 64 bits. However, a bit series consisting of 51 bits is used, and consequently 51 positions, in order to have the ability to determine the rotational position of the partial surface. An example of such a bit series is:

0 0 0 0 0 1 1 0 0 0 1 1 1 1 1 0 1 0 1 0 1 1 0 1 1 0 0 1 1
0 1 0 0 0 1 0 1 0 0 1 1 1 0 1 1 1 1 0 0 1 0

Such a partial surface consisting of six by six marks can theoretically code $4^{6*6}$ positions, which with the above-mentioned raster dimensions of 0.3 mm is an extremely large surface.

In a similar way as described above for the seven-bit series, according to the present invention the characteristic is utilized that the partial surface is enlarged to include one bit on each side of the partial surface, at least at its center, so that for the third and fourth rows in the partial surface of 6*6 symbols, 8 symbols are read, one on each side of the partial surface, and similarly in the y-direction. The above-mentioned bit series which contains 51 bits has the characteristic that a bit sequence of 6 bits occurs only once and that a bit sequence of 8 bits which contains the above-mentioned bit sequence of 6 bits occurs only once and never in an inverted position or reversed and inverted. In this way, the rotational position of the partial surface can be determined by reading eight bits in row 3, row 4, column 3 and/or column 4. When the rotational position is known, the partial surface can be rotated to the correct position before the processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 2a to 2d. In order to increase the randomness further or avoid repetitive characteristics, a method can be used which is called "shuffle". Each horizontal bit sequence starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 1 is "spiky".

In the example above, with a 4*4 code window, the displacement vector can be 1, 2, 4, 0 for LSB=0 and 2, 2, 3, 0 for LSB=1. This means that after subtracting the number 2 and 0 respectively, the above displacement is to be subtracted (modulo five) from the bit sequence's position number, before the processing continues. In the example above, for the y-coordinate the digits 4 1 0 0 ($S_2$, $S_1$, $S_0$, $S_4$) are obtained in the mixed base, where the second digit from the right is the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also have other arrangements, such as along the raster lines in a raster with 60 degree angles, etc. A polar coordinate system can also be used.

Figure 5:
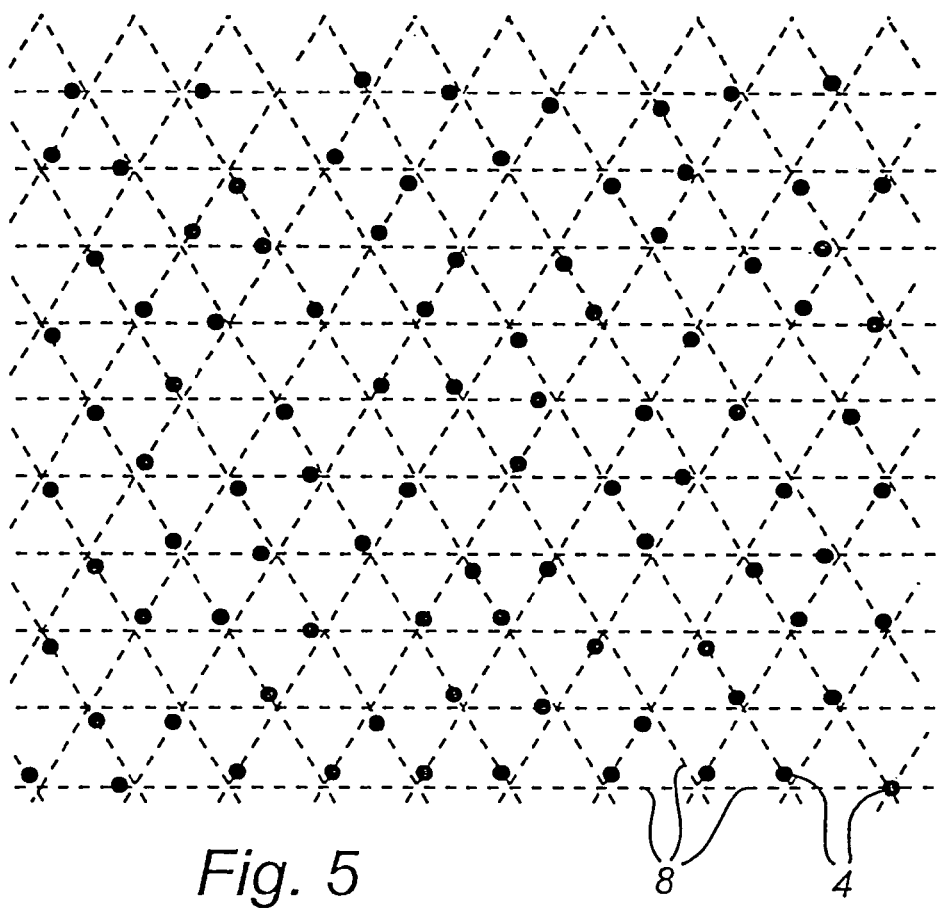
FIG. 5 shows schematically a position-coding pattern with a triangular raster.
Figure 6:
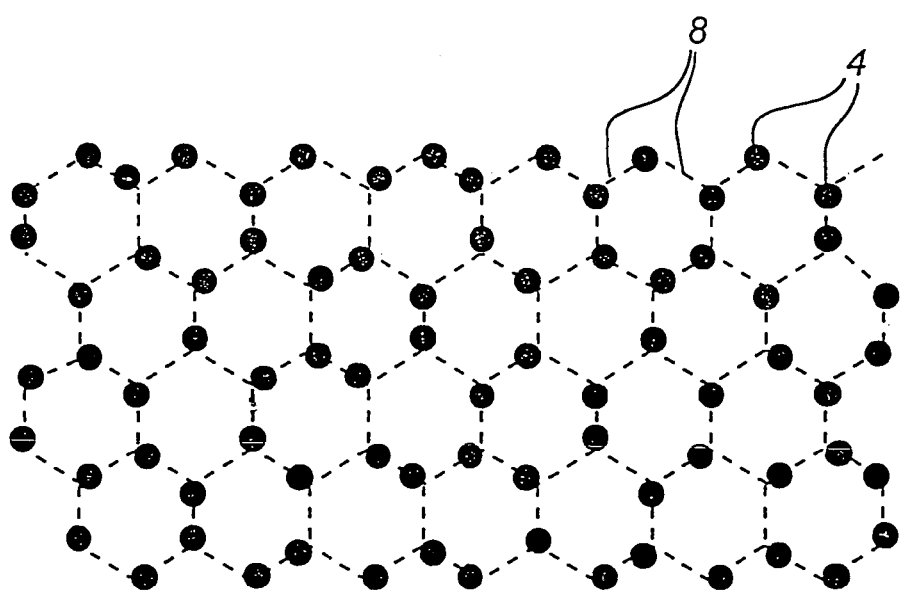
FIG. 6 shows schematically a position-coding pattern with a hexagonal raster.

Rasters in the form of triangles or hexagons can also be used, as shown in FIGS. 5 and 6. For example, a raster with triangles, see FIG. 5, enables each mark to be displaced in six different directions, which provides even greater possibilities, corresponding to $6^{6*6}$ partial surface positions. For a hexagonal raster, FIG. 6, a honeycomb pattern, each mark can be displaced in three different directions along the raster lines.

As mentioned above, the marks do not need to be displaced along the raster lines but can be displaced in other directions, for example in order to be located each in a separate quadrant when using a square raster pattern. In the hexagonal raster pattern the marks can be displaced in four or more different directions, for example in six different directions along the raster lines and along lines which are at 60 degrees to the raster lines.

In order for the position code to be able to be detected, it is necessary for the virtual raster to be determined. This can be carried out, in a square raster pattern, by examining the distance between different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 μm along the raster lines, which are a distance of 300 μm apart, the least distance between two marks will be 200 μm, for example between marks with the values 1 and 3. The next smallest distance arises between, for example, marks with the values 1 and 2, and is 255 μm. There is therefore a relatively distinct difference between the least and the next smallest distance. The difference to any diagonals is also great. However, if the displacement is larger than 50 μm, for example more than 75 μm (¼), diagonals can cause problems and it can be difficult to determine to which nominal position a mark belongs. If the displacement is less than 50 μm, for example less than approximately 35 μm (⅛), the least distance will be 230 μm, which does not give a very large difference to the next distance, which is then 267 μm. In addition, the demands on the optical reading increase.

The marks should not cover their own raster point and should therefore not have a larger diameter than twice the displacement, that is 200%. This is, however, not critical, and a certain overlapping can be permitted, for example 240%. The least size is determined in the first place by the resolution of the sensor and the demands of the printing process used to produce the pattern. However, the marks should not have a smaller diameter than approximately 50% of the displacement in practice, in order to avoid problems with particles and noise in the sensor.

Figure 4:
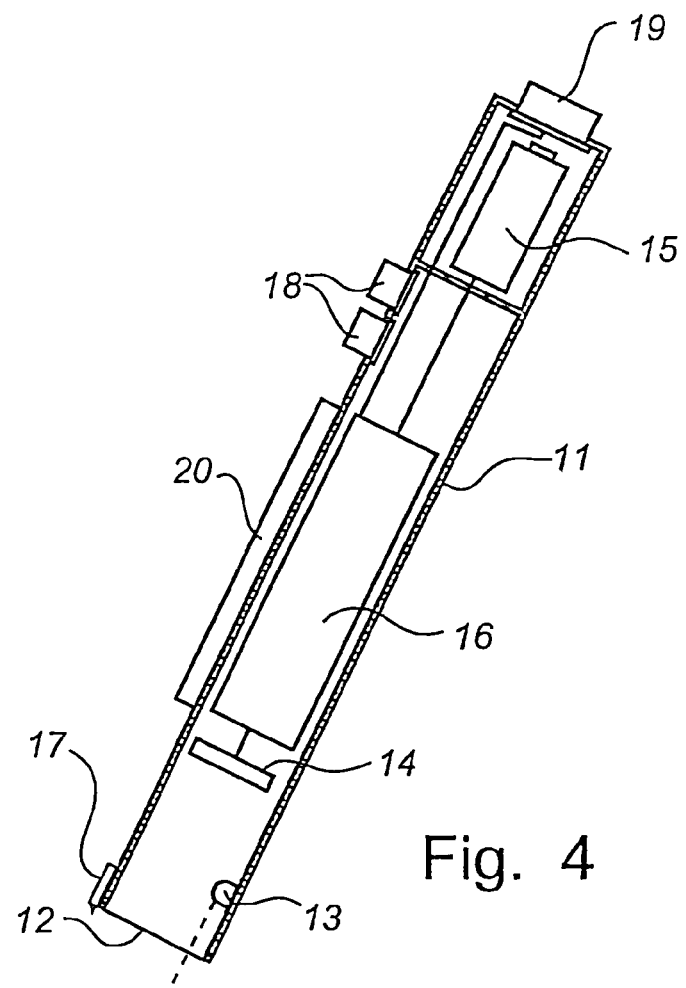
FIG. 4 shows schematically a device which can be used for position determination.

An embodiment of a device for position determination is shown schematically in FIG. 4. It comprises a casing 11 which has approximately the same shape as a pen. In the short side of the casing there is an opening 12. The short side is intended to abut against or to be held a short distance from the surface on which the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. If required, the device can also contain an optical system, such as a mirror and/or lens system. The light-emitting diode can be an infrared light-emitting diode and the sensor can be sensitive to infrared light.

The power supply for the device is obtained from a battery 15, which is mounted in a separate compartment in the casing.

The electronic circuitry part contains image-processing means 16 for determining a position on the basis of the image recorded by the sensor 14 and in particular a processor unit with a processor which is programmed to read images from the sensor and carry out position determination on the basis of these images.

In this embodiment, the device also comprises a pen point 17, with the aid of which ordinary pigment-based writing can be written on the surface on which the position determination is to be carried out. The pen point 17 is extendable and retractable so that the user can control whether or not it is to be used. In certain applications the device does not need to have a pen point at all.

The pigment-based writing is suitably of a type that is transparent to infrared light and the marks suitably absorb infrared light. By using a light-emitting diode which emits infrared light and a sensor which is sensitive to infrared light, the detection of the pattern can be carried out without the above-mentioned writing interfering with the pattern.

The device also comprises buttons 18, by means of which the device-can be activated and controlled. It has also a transceiver 19 for wireless transmission, for example using infrared light, radio waves or ultrasound, of information to and from the device. The device can also comprise a display 20 for displaying positions or recorded information.

A device for recording text is described in Applicant's Swedish Patent No. 9604008-4. This device can be used for position determination if it is programmed in a suitable way. If it is to be used for pigment-based writing, then it must also be given a pen point.

The device can be divided between different physical casings, a first casing containing components which are required for recording images of the position-coding pattern and for transmitting these to components which are contained in a second casing and which carry out the position determination on the basis of the recorded image(s).

As mentioned, the position determination is carried out by a processor which thus must have software for locating marks in an image and decoding them and for determining positions from the codes thus obtained. A person skilled in the art will be able, based on the example above, to design software which carries out position determination on the basis of an image of a part of a position-coding pattern.

In addition, on the basis of the description above, a person skilled in the art will be able to design software for printing out the position-coding pattern.

In the embodiment above, the pattern is optically readable and the sensor is therefore optical. As mentioned, the pattern can be based on a parameter other than an optical parameter. In such a case the sensor must of course be of a type which can read the parameter concerned. Examples of such parameters are chemical, acoustic or electromagnetic marks. Capacitive or inductive marks can also be used.

In the embodiment above, the raster is an orthogonal grid. It can also have other forms, such as a rhombic grid, for example with 60 degree angles, a triangular or hexagonal grid, etc.

Displacement in more or less than four directions can be used, for example displacement in three directions along a hexagonal virtual raster. In an orthogonal raster only two displacements can be used, in order to facilitate the recreation of the raster. However, a displacement in four directions is preferred, but six or eight directions are also possible within the scope of the invention.

In the embodiment above, the longest possible cyclic number series is not used. As a result, a degree of redundancy is obtained which can be used in various ways, for example to carry out error correcting, replace missing or hidden marks, etc.

The invention claimed is:

1. A product for determining a position, comprising:
a surface; and
a code on said surface for determination of at least one position in a first direction,
wherein said code for position-coding in said first direction comprises at least one first main number series, which has the property that the place in the first main number series of each number sequence of a first predetermined length is unambiguously determined, said position being determinable based on at least one such number sequence of the first predetermined length, and
wherein the orientation of said code is discriminable from the first main number series, but only for number sequences of a second predetermined length that exceeds the first predetermined length.

2. The product as set forth in claim 1, wherein said orientation is discriminable from the occurrence of nonallowed number combinations in said number sequences of the second predetermined length.

3. The product as set forth in claim 1, wherein no number sequence of the second predetermined length in the first main number sequence occurs in a reversed form in the first main number sequence.

4. The product as set forth in claim 3, wherein said code is represented by a set of symbols which each code one number in the first main number series, and wherein said set comprises two unique symbols that are assigned the same number and which are indistinguishable on a rotation of 180° of one to the other.

5. The product as set forth in claim 1, wherein the first main number sequence is binary, and wherein no number sequence of the second predetermined length in the first main number sequence occurs in a reversed and inverted form in the first main number sequence.

6. The product as set forth in claim 5, wherein said code is represented by a set of symbols which each code one binary number in the first main number series, and wherein said set comprises two unique symbols which are indistinguishable on a rotation of 180° of one to the other, one of said symbols being assigned the inverse binary number of the other symbol.

7. The product as set forth in claim 1, wherein the place in the first main number series of each number sequence of the second predetermined length is unambiguously determined.

8. The product as set forth in claim 1, wherein the first predetermined length is six numbers, and the second predetermined length is eight numbers.

9. The product as set forth in claim 1, wherein said code comprises a plurality of parallel first main number series, and wherein adjacent first main number series are relatively shifted by a predetermined displacement, said position in the first direction being determinable based on a predetermined number of such displacements.

10. The product as set forth in claim 1, wherein said first main number series is cyclic.

11. The product as set forth in claim 1, wherein said code comprises at least one second main number series which corresponds to the first main number series with respect to its properties for position determination and orientation discrimination, the first and second main number series being arranged on the surface such that a rotation of the code by 900°, 180° and 270° is discriminable from at least one of the first and second main number series.

12. The product as set forth in claim 11, wherein a rotation of the code by 90° is discriminable from the first main number series only, and a rotation of the code by 270° is discriminable from the second main number series only.

13. The product as set forth in claim 11, wherein a rotation of the code by 180° is separately discriminable from either of the first and second main number series.

14. The product as set forth in claim 11, wherein at least one position in a second direction is determinable based on the second main number series.

15. The product as set forth in claim 14, wherein the first and second directions are mutually orthogonal.

16. The product as set forth in claim 11, wherein said code comprises a plurality of parallel first main number series and a plurality of parallel second main number series, said first and second main number series being arranged mutually orthogonal.

17. The product as set forth in claim 11, wherein said first and second main number series are identical.

18. The product as set forth in claim 11, wherein said number sequence of the second predetermined length on the surface maps on a corresponding number sequence of the second main number series upon a rotation of said code by 90° or 270°.

19. The product as set forth in claim 1, wherein said code comprises at least one second main number series for position-coding in a second direction.

20. The product as set forth in claim 19, wherein said code comprises a two-dimensional array of graphical symbols that each represents one of at least four different values, and wherein the value of each symbol is translatable to at least one first number of said at least one first main number series and at least one second number of said at least one second main number series.

21. A method for providing a code on a surface, to code at least one position in a first direction on the surface, said method comprising:
using at least one first main number series, which has the property that the place in the first main number series of each number sequence of a first predetermined length is unambiguously determined and which also discriminates the orientation of the code, but only for number sequences of a second predetermined length that exceeds the first predetermined length;

determining at least one number sequence of the first predetermined length that codes said at least one position; and applying to the surface at least one number sequence of the second predetermined length that includes the thus-determined number sequence(s) of the first predetermined length.

22. The method as set forth in claim 21, wherein said orientation is discriminable from the occurrence of non-allowed number combinations in said number sequences of the second predetermined length.

23. The method as set forth in claim 21, wherein no number sequence of the second predetermined length in the first main number sequence occurs in a reversed form in the first main number sequence.

24. The method as set forth in claim 23, further comprising: representing said at least one number sequence of the second predetermined length by a set of symbols which each code one number in said first main number series, wherein said set comprises two unique symbols that are assigned the same number and which are indistinguishable on a rotation of 180° of one to the other.

25. The method as set forth in claim 21, wherein the first main number sequence is binary, and wherein no number sequence of the second predetermined length in the first main number sequence occurs in a reversed and inverted form in the first main number sequence.

26. The method as set forth in claim 25, further comprising: representing said at least one number sequence of the second predetermined length by a set of symbols which each code one binary number in the first main number series, wherein said set comprises two unique symbols which are indistinguishable on a rotation of 180° of one to the other, one of said symbols being assigned the inverse binary number of the other symbol.

27. The method as set forth in claim 21, wherein the place in the first main number series of each number sequence of the second predetermined length is unambiguously determined.

28. The method as set forth in claim 21, wherein the first predetermined length is six numbers, and the second predetermined length is eight numbers.

29. The method as set forth in claim 21, further comprising: determining a plurality of parallel number sequences of the first predetermined length, wherein adjacent number sequences have a predetermined difference between their places in the first main number series, a predetermined number of such differences coding said position in the first direction; and applying to the surface said plurality of parallel number sequences of the first predetermined length, wherein at least one such number sequence is applied as included in a number sequence of the second predetermined length.

30. The method as set forth in claim 21, wherein said first main number series is cyclic.

31. The method as set forth in claim 21, further comprising: using at least one second main number series which corresponds to the first main number series with respect to its properties for position determination and orientation discrimination; and applying subsets of the first and second main number series to the surface such that a rotation of the code by 90°, 180° and 270° is discriminable from at least one of said subsets.

32. The method as set forth in claim 31, wherein a rotation of the code by 90° is discriminable from a subset of the first main number series only, and a rotation of the code by 270° is discriminable from a subset of the second main number series only.

33. The method as set forth in claim 31, wherein a rotation of the code by 180° is separately discriminable from a subset of either the first or the second main number series.

34. The method as set forth in claim 31, wherein at least one position in a second direction is determinable based on the second main number series.

35. The method as set forth in claim 34, wherein the first and second directions are mutually orthogonal.

36. The method as set forth in claim 31, further comprising: applying a plurality of parallel first main number series and a plurality of parallel second main number series to the surface in a mutually orthogonal relationship.

37. The method as set forth in claim 31, wherein said first and second main number series are identical.

38. The method as set forth in claim 31, further comprising: applying said number sequence of the second predetermined length on the surface such that is maps on a corresponding number sequence of the second main number series upon a rotation of said partial surface by 90° or 270°.

39. The method as set forth in claim 21, further comprising using at least one second main number series for position-coding in a second direction.

40. The method as set forth in claim 39, further comprising: forming a two-dimensional array of graphical symbols that each represents one of at least four different values, wherein the value of each symbol is translatable to at least one first number of said at least one first main number series and at least one second number of said at least one second main number series; and applying the two-dimensional array to the surface.

41. A method of determining a position, in a first direction, of an arbitrary partial surface of a predetermined size on a surface which is provided with a position code, which for the position coding in the first direction is based on at least one first main number series, which has the property that the place in the first main number series of each number sequence of a first predetermined length is unambiguously determined and which discriminates the orientation of said position code, but only for number sequences of a second predetermined length that exceeds the first predetermined length, said method comprising:

identifying at least one number sequence of the second predetermined length from the position code on the partial surface;

identifying a correct orientation of said partial surface based on the thus-identified number sequence of the second predetermined length, identifying a correctly oriented number sequence of the first predetermined length from the position code on the partial surface; and determining said position based on said correctly oriented number sequence of the first predetermined length.

42. The method as set forth in claim 41, wherein said identifying of a correct orientation comprises determining the orientation of said partial surface based on the thus-identified number sequence.

43. The method as set forth in claim 41, wherein said identifying of a correct orientation comprises sequentially evaluating the thus-identified number sequence for possible orientations of said partial surface until a correct orientation is determined.

44. The method as set forth in claim 41, wherein said orientation is discriminable from the occurrence of non-allowed number combinations in the thus-identified number sequence.

45. The method as set forth in claim 41, wherein no number sequence of the second predetermined length in the first main number sequence occurs in a reversed form in the first main number sequence.

46. The method as set forth in claim 41, wherein the first main number sequence is binary, and wherein no number sequence of the second predetermined length in the first main number sequence occurs in a reversed and inverted form in the first main number sequence.

47. The method as set forth in claim 41, wherein the first predetermined length is six numbers, and the second predetermined length is eight numbers.

48. The method as set forth in claim 41, further comprising: identifying a plurality of correctly oriented number sequences of the first predetermined length; determining for each such number sequence a position number that reflects the place of the number sequence in the first main number sequence; determining differences in position numbers for adjacent number sequences; and determining said position in the first direction based on a predetermined number of said differences.

49. The method as set forth in claim 41, for determining a position in a first and a second direction, wherein the position code for position coding in the second direction is based on at least one second main number series which corresponds to the first main number series with respect to its properties for position determination and orientation discrimination, said method comprising: identifying a correct orientation of said partial surface based on a number sequence of the second predetermined length belonging to at least one of the first and second main number sequences.

50. The method as set forth in claim 49, further comprising: detecting a rotation of the partial surface by 90° based exclusively on a number sequence of the second predetermined length belonging to the first main number series, and detecting a rotation of the partial surface by 270° based exclusively on a number sequence of the second predetermined length belonging to the second main number series.

51. The method as set forth in claim 49, further comprising: detecting a rotation of the partial surface by 180° based on a number sequence of the second predetermined length belonging to either one of the first and second main number series.

52. The method as set forth in claim 49, further comprising: determining said position in the second direction based on at least one correctly oriented number sequence of the first predetermined length belonging to the second main number series.

53. The method as set forth in claim 49, wherein the first and second directions are mutually orthogonal.

54. The method as set forth in claim 49, wherein the first and second main number series are mutually orthogonal.

55. The method as set forth in claim 49, wherein the first and second main number series are identical.

56. The method as set forth in claim 41, further comprising determining a position in a second direction based on at least one second main number series.

57. The method as set forth in claim 56, further comprising: identifying a plurality of symbols on the partial surface; determining a value of each of said symbols; translating the value of each symbol into at least one first number and at least one second number; and identifying, based on the first and second numbers, at least one number sequence of the second predetermined length.

58. The method as set forth in claim 57, further comprising: forming first and second sets of said first numbers and second numbers, respectively; identifying at least one number sequence of the second predetermined length in each of the first and second sets; and designating the first and the second position to a position value given by the first and second sets, respectively, whenever the number sequence of the second predetermined length fulfills a predetermined orientation criterion in both the first and the second set.

59. The method as set forth in claim 58, wherein the second predetermined length in the first main number series is identical to the second predetermined length in the second main number series.

60. A computer-readable medium storing a computer program with instructions to cause a computer to implement a method for providing a code on a surface, to code at least one position in a first direction on the surface, said method comprising:
using at least one first main number series, which has the property that the place in the first main number series of each number sequence of a first predetermined length is unambiguously determined and which also discriminates the orientation of the code, but only for number sequences of a second predetermined length that exceeds the first predetermined length;
determining at least one number sequence of the first predetermined length that codes said at least one position; and
applying to the surface at least one number sequence of the second predetermined length that includes the thus-determined number sequence(s) of the first predetermined length.

61. A device for position determination, comprising a sensor for producing an image of a partial surface of a surface which is provided with a position code, and image processing means which are arranged to calculate based on the subset of the position code which is to be found in the image of the partial surface a position of the partial surface in accordance with a method of determining position, in a first direction, of the arbitrary partial surface of a predetermined size on the surface which is provided with the position code, which for the position coding in the first direction is based on at least one first main number series, which has the property that the place in the first main number series of each number sequence of a first predetermined length is unambiguously determined and which discriminates the orientation of said position code, but only for number sequences of a second predetermined length that exceeds the first predetermined length, said method comprising:
identifying at least one number sequence of the second predetermined length from the position code on the partial surface;
identifying a correct orientation of said partial surface based on the thus-identified number sequence of the second predetermined length,
identifying a correctly oriented number sequence of the first predetermined length from the position code on the partial surface; and
determining said position based on said correctly oriented number sequence of the first predetermined length.

62. The device as set forth in claim 61, which is handheld.

63. The device as set forth in claim 61, which has means for wireless transmission of position information.

* * * * *